United States Patent [19]

Palmer et al.

[11] Patent Number: 4,942,013

[45] Date of Patent: Jul. 17, 1990

[54] VACUUM RESIN IMPREGNATION PROCESS

[75] Inventors: Raymond J. Palmer, Newport Beach; Gerard R. Bonnar, Irvine; William E. Moore, Lytle Creek, all of Calif.

[73] Assignee: McDonnell Douglas Corporation, Long Beach, Calif.

[21] Appl. No.: 329,029

[22] Filed: Mar. 27, 1989

[51] Int. Cl.$^5$ .............................................. B29C 43/12
[52] U.S. Cl. .................................. 264/511; 156/285; 264/571; 264/257
[58] Field of Search ............... 264/510, 102, 101, 313, 264/316, DIG. 78, 257, 511, 571; 156/286, 104, 285; 427/294, 296

[56] References Cited

U.S. PATENT DOCUMENTS

| | | | |
|---|---|---|---|
| 2,913,036 | 11/1959 | Smith | 264/DIG. 53 |
| 3,309,450 | 3/1967 | Rodgers | 156/242 |
| 3,575,756 | 4/1971 | Maus | 156/286 |
| 3,703,422 | 11/1972 | Yoshino | 156/285 |
| 4,238,437 | 12/1980 | Rolston | 264/263 |
| 4,311,661 | 1/1982 | Palmer | 264/510 |
| 4,353,862 | 10/1982 | Kaman II | 156/286 |
| 4,562,033 | 12/1985 | Johnson et al. | 264/510 |
| 4,622,091 | 11/1986 | Letterman | 156/309.6 X |
| 4,873,044 | 10/1989 | Epel | 264/257 |

*Primary Examiner*—Merrell C. Cashion, Jr.
*Assistant Examiner*—Michele K. Yoder
*Attorney, Agent, or Firm*—Max Geldin

[57] ABSTRACT

A process and system for vacuum impregnation of a fiber reinforcement, such as carbon cloth, with a resin to produce a resin-fiber composite. Liquid resin enters in arrangement or system comprising a fiber reinforcement layer on a tool or mold and is directed via a system of flow paths to impregnate the fiber reinforcement layer uniformly across the width thereof and along the length of the fiber reinforcement layer. According to one embodiment, a fiber reinforcement layer, e.g., carbon cloth, is placed on a tool. A porous paring film is applied over the fiber reinforcement layer and a bleeder layer, e.g., fiberglass, is applied over the parting film. A non-pourous film is placed over the bleeder layer, a breather cloth, e.g., fiberglass, is then applied over the non-porous film, and a vacuum bag is placed over the entire assembly and sealed to the mold surface. Liquid resin is fed to the assembly within the vacuum bag. Resin spreader means, e.g., a transverse strip of fiberglass cloth, or mechanical means, such as a slotted tube, receives the liquid resin and distributes it initially across the panel adjacent one end of the reinforcement layer after the vacuum has been applied to the assembly. The liquid resin is drawn through the bleeder cloth and through the fiber reinforcement layer from one end to the opposite thereof to completely impregnate same. The resin system is designed so that it will commence to gel when the liquid resin has completely impregnated the fiber reinforcement layer.

32 Claims, 5 Drawing Sheets

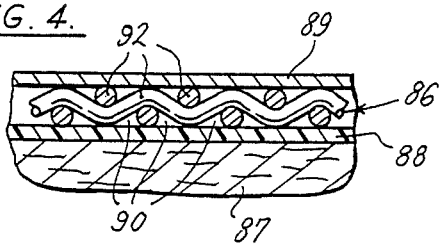
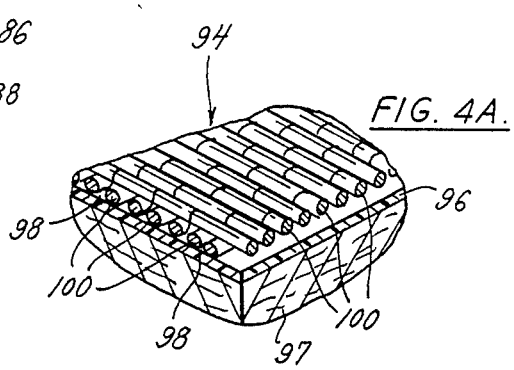
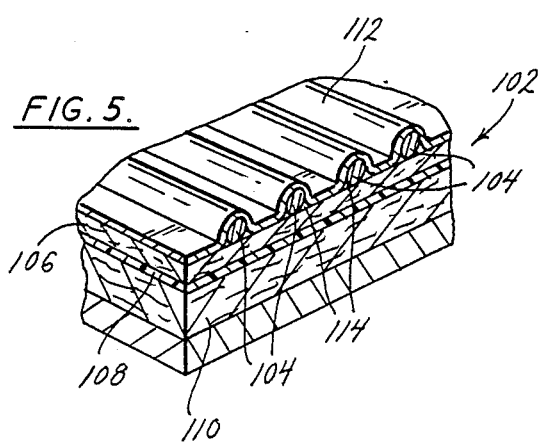
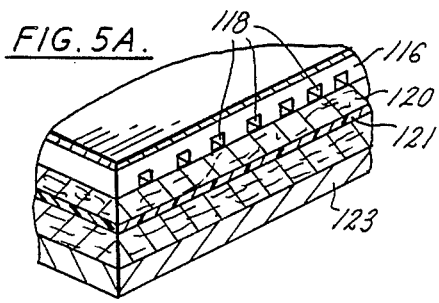
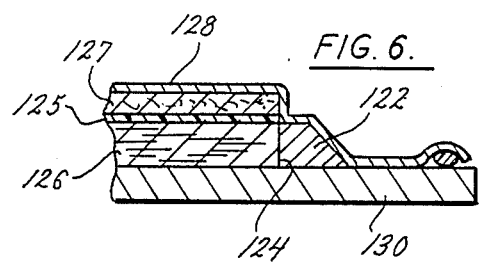
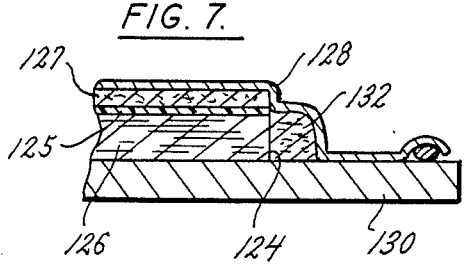
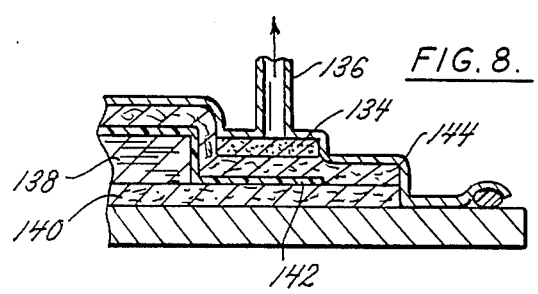

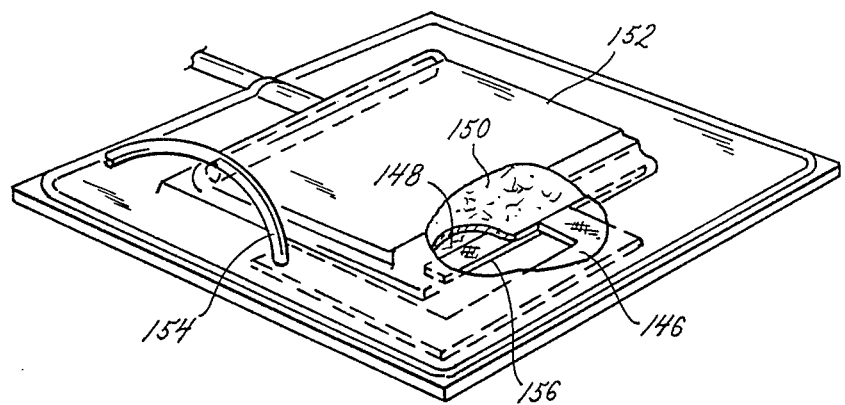
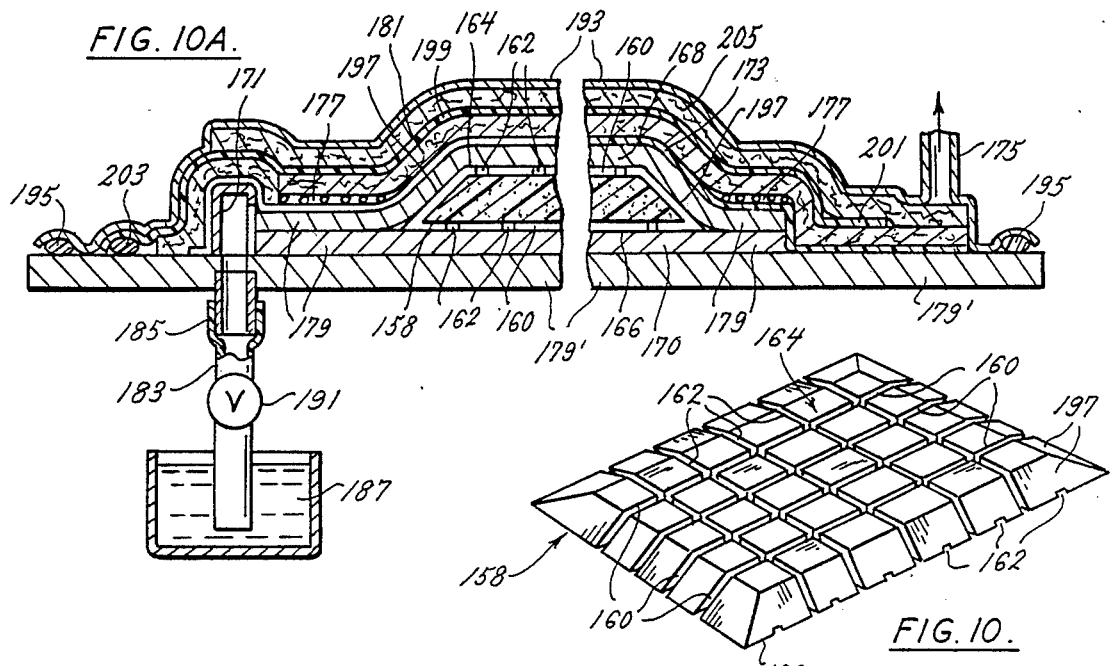
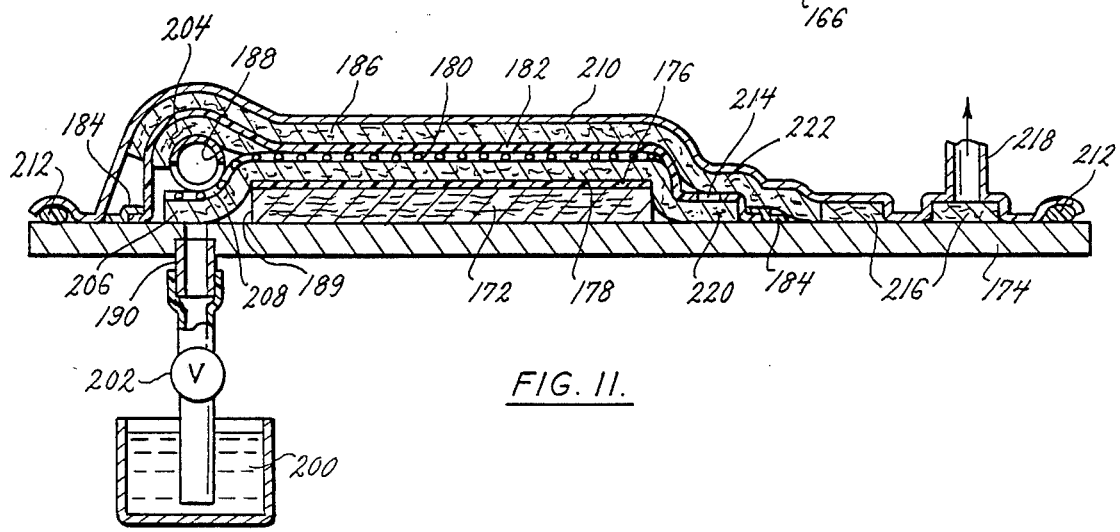

VACUUM RESIN IMPREGNATION PROCESS

BACKGROUND OF THE INVENTION

This invention relates to a process for producing resin impregnated fiber reinforced materials and is particularly concerned with novel procedure for impregnating dry fiber reinforcement, particularly carbon or graphite cloth, with a predetermined amount of resin, so as to impregnate such fiber reinforcement rapidly and uniformly throughout the fiber reinforcement, followed by final curing, to produce a resin impregnated reinforcement material which is essentially completely and uniformly impregnated with resin.

The concept of impregnating dry fibrous materials, such as glass fiber, with a resin under vacuum conditions and curing the resin to produce a composite is known in the art, as disclosed, for example, in U.S. Pat. Nos. 3,028,284; 3,322,566; 3,384,505; 3,523,152; 3,790,432; and 4,030,953.

Fiber reinforced organic resin composite structures are fabricated using two basic forms of materials, namely, prepreg ("B" stage) resin impregnated fiber forms and wet resin impregnation of fiber forms.

In the prepreg process, woven cloth or yarn or fiber tow is impregnated at one facility, with a prescribed amount of organic resin. The resin is staged and dried, usually to a "tacky" "B" stage condition, that is, in a partially cured condition. The material is then packaged between layers of separation film and stored in sealed containers, usually at low temperature, for extended periods of time before it is used and fully cured for final part processing.

The prepreg operation has a number of disadvantages. It requires a separate manufacturing facility, and the "B" stage material usually must be stored at low temperature and in sealed bags to avoid contact with moisture. The resins must be "conditioned" to a specific state of polymerization or tack, and then the process must be stopped to retain this tack condition over an extended period of time, and thereafter, the resins must still have the proper processing characteristics for final curing. Further, the prepreg material is generally laid up by hand, and there is much direct personal contact with the "B" stage resin, which is undesirable.

In the wet resin impregnation process, woven cloth or yarn is impregnated with a liquid resin that is catalyzed to process or cure in a short continuous period of time. In this process, the resin is usually impregnated by squeegee of ply by ply of a layup at the site of component fabrication. The impregnated material can be handled at room temperature or elevated temperature for a certain time period during which the resin gels, followed by final curing either at room temperature or elevated temperature in the same tool or mold.

Disadvantages of the wet resin process are that it is messy and there is much direct personal contact with the resin, which is undesirable, and it is difficult to obtain the desired amount and uniform resin content free of voids and bubbles. Wet resin content fabricated products are usually of higher resin content than similar "B" stage fabricated products, in order to assure freedom of void within the laminate, and thus, such panels are heavier than panels made with "B" stage materials.

In one form of the vacuum impregnation wet resin process, resin and catalyst systems are mixed in a container, degassed, and then introduced from the container directly to a dry cloth fiber reinforcement layer or layup, placed on a tool. A vacuum bag is placed over the dry cloth layup with an inlet tube from the resin container to an edge of the layup under the vacuum bag. The vacuum bag outlet to the vacuum source is at the center of the assembly. When a vacuum is pulled, the bag pulls against the layup, and when the resin is released, it passes through the tube from the resin container and impregnates the dry fiber reinforcement or cloth from the edge thereof, and thereafter, resin flow proceeds toward the vacuum outlet at the center of the fiber reinforcement. When the resin reaches the vacuum outlet, the part is impregnated, and the resin inlet is sealed to stop any additional resin flow. The cure cycle is completed with continued vacuum pressure and heat.

While this process, as described above, works satisfactorily for fabrication with medium-size fiberglass reinforcement panels, e.g., of about 3 feet by 4 feet, when impregnated with, for example, epoxy resin, the process does not satisfactorily impregnate close weave fiber reinforcement, such as carbon fiber panels, entirely along the length and width thereof, to useful large size, using the same resin system and technique. The fiber wetting characteristics are substantially very different between fiberglass and carbon cloth reinforcements. Using presently practiced wet resin processes, the obtainment of close thickness or tight resin content tolerance throughout the impregnated fiber reinforcement, from the resin inlet area to the vacuum outlet side of the fiber reinforcement, is difficult to achieve.

U.S. Pat. No. 4,311,661 to Palmer discloses a resin impregnation process employing either a "B" stage resin or a wet resin, such as a liquid epoxy resin. However, in this arrangement, whether a "B" stage resin or a liquid resin is employed, the resin material is in the form of a layer on the tool and is entirely enclosed within the vacuum bag as in the form of a cocoon. Thus, in this patent, for example, a "B" stage resin film or a wet resin film is applied to a mold surface, a fiber reinforcement layer, such as fiberglass, is placed thereover, a bleeder layer is placed over the fiber reinforcement layer, and a non-porous material is positioned over the bleeder layer. A vacuum bag is placed over the arrangement, a vacuum is applied to the mold, and the mold is heated to a temperature sufficient to cause the "B" stage resin to flow and to impregnate through the thickness of the reinforcement layer and to impregnate the bleeder layer. The mold pressure is then increased, and the temperature is raised to produce final curing of the resin impregnated fiber reinforcement layer.

It is an object of the present invention to provide an improved wet resin impregnation process for impregnating dry fiber reinforcement material, particularly carbon fiber reinforcement, so as to produce uniform impregnation of resin into the fiber reinforcement material from side to side and from one end to the other or, if desired, through the thickness of the reinforcement material.

Another object is the provision of a process for wet resin impregnation of a fiber reinforcement so that it is uniformly saturated or impregnated with a predetermined desired resin content from side to side and from end to end of the fiber reinforcement layer.

Another object is to provide a wet resin process for uniformly impregnating fiber reinforcement material with a thermosetting resin, and curing the resin, directly on a tool or mold.

A further object is to provide a process for rapidly impregnating fiber reinforcement material which can be scaled up to large-size components without need for expensive autoclave equipment.

Another object is the provision of a process for producing sandwich panels directly on a tool by uniform resin impregnation of fiber reinforcement skins positioned on the outer surfaces of a supporting member, such as a foam core.

A still further object is the provision of a process for resin impregnation of a fiber reinforcement which can be carried out in a closed system, and wherein there is no physical contact by personnel with the resin and no escape of volatiles from the closed system to the exterior ambient atmosphere.

Yet another object is the provision of systems for carrying out the above processes.

SUMMARY OF THE INVENTION

According to the concept of the present invention, liquid resin enters an arrangement or system comprising a fiber reinforcement layer on a tool or mold and is directed via a system of flow paths to impregnate the fiber reinforcement layer uniformly across the width thereof and along the length of the fiber reinforcement layer. The liquid resin system employed is such that the resin commences to gel when the liquid resin has essentially completely impregnated the fiber reinforcement layer. Thereafter, the resin is cured at ambient or elevated temperature to produce a composite.

According to one embodiment, a dry fiber reinforcement layer or layup, e.g., carbon cloth, is placed on the surface of a tool or mold. A permeable or porous parting film is then applied over the dry fiber reinforcement layer, and a bleeder layer is applied over the permeable parting film. Such bleeder material can be, for example, glass fiber cloth.

A non-porous separator film is then used to seal the overall surface of the assembly. A breather cloth is then applied over the seal film, and a vacuum bag is placed over the entire assembly and sealed to the mold surface.

Liquid resin in a container externally of the vacuum bag assembly is fed via a line to the assembly within the vacuum bag. Resin spreader means, for example, a transverse strip of fiberglass cloth, or mechanical means, such as a slotted tube, slotted channel or coiled wire, covered with fiberglass cloth, receives the liquid resin and distributes it initially transversely across the edge of the panel at one end of the reinforcement layer after the vacuum has been applied to the assembly. The liquid resin under the pull of the vacuum then is drawn through the bleeder cloth above the fiber reinforcement layer at the resin inlet end and proceeds into and through the fiber reinforcement layer longitudinally therein from one end thereof to the opposite end of the fiber reinforcement layer to completely impregnate same. The resin system is catalyzed and designed so that under controlled temperature conditions, e.g., between ambient temperature and final cure temperature, it will commence to gel when the liquid resin has completely impregnated the fiber reinforcement layer.

According to another feature, means, preferably in the form of a fiberglass extension or tongue is provided, which communicates with the breather cloth and with the bleeder layer at the outer ends thereof, and which contains the vacuum outlet at its outer end. Thus, any excess liquid resin which exits at the outer end of the fiber reinforcement layer will pass through the outer ends of the bleeder layer and breather cloth and through the tongue. Passage of the liquid resin through the tongue provides adequate time so that the resin will gel before it reaches the vacuum outlet line. This avoids any undesirable passage of liquid resin into the vacuum pump, thus in effect providing an extended vacuum outlet line from the far end of the fiber reinforcement layup.

As an alternative to use of the above-described fiberglass tongue to avoid passage of liquid resin into the vacuum pump, there can be employed a micro-porous filter in the vacuum outlet, to pass volatiles but not liquid resin after resin impregnation of the fiber reinforcement layer has been completed.

An additional feature is the employment of "mechanical" flow paths for the liquid resin to further facilitate impregnation of the liquid resin into the fiber reinforcement layer. Such mechanical flow paths can be provided in the form of a screen or spaced rods positioned above the bleeder layer and which facilitate passage of liquid resin from the resin spreader means at one end of the assembly, longitudinally thereof, through the bleeder layer, and into the fiber reinforcement layer for passage longitudinally therein from one end to the other end thereof, as described above.

Following impregnation of the fiber reinforcement layer according to the invention process as described above, the resin gel permeating or saturating the fiber reinforcement layer is subjected to curing in the same tool, under vacuum pressure only, and under time and temperature conditions appropriate for the particular resin system.

According to another modification of the invention, composite structural sandwich panels formed of a supporting block, particularly foam core, and having thin resin impregnated fiber reinforcement skins, can be provided using the principles of the invention as described in detail hereinafter.

According to still another modified form of the invention, particularly adapted to make large area fiber reinforced resin panels or parts on transport aircraft, the vacuum resin impregnation process of the invention can incorporate modified means to vacuum impregnate liquid state resin under controlled temperature conditions into and across the width or length and throughout the thickness of a dry fiber preform or layup in place on a tool.

In this modified process and arrangement, a runner caul plate having lower surface runner channels and upper outlet holes, both preferably tapered, is placed on the base tool. The dry fiber preform is placed on the upper surface of the runner plate. An upper pressure plate, with holes offset from the outlet holes in the lower runner plate, is located over the dry preform. The upper pressure plate is sealed to the base tool to form a cocoon between the base plate and the upper pressure plate, with the dry preform and lower runner plate in the cocoon.

A bleeder cloth is located over the cocoon assembly, and a vacuum bag is placed over the entire assembly and sealed to the base tool. An outlet is located in the vacuum bag in a position remote from the cocoon.

The tool and layup arrangement can be placed in an oven and heated to a desired temperature. A resin pot is located outside the oven. A vacuum is drawn, pulling the resin through a connecting line into and along the runner channels in the runner plate, up through the outlet holes in the runner plate, into and through the fiber preform to impregnate same with the resin, up through the offset holes in the upper pressure plate, and into the bleeder cloth. The resin gels shortly after it reaches the bleeder cloth, and the cure cycle can be completed while the vacuum pressure is applied.

The resin impregnation and bagging technique of the present invention has several advantages over presently known devices or systems. Thus, the concept of the present invention can be employed and the system scaled up to obtain impregnation of large fiber reinforcement components using fiberglass, Kevlar (aromatic polyamide fiber marketed by Dupont), boron, and particularly carbon fiber cloth reinforcement without the necessity for expensive equipment. Heretofore, only very small graphite or carbon-fiber parts could be satisfactorily impregnated with resin. In addition, the uniformity of thickness and overall area resin percent impregnation control is substantially improved for all types of fiber reinforced laminate. In the wet resin process of the present invention, at no point is it necessary to "touch" the wet resin, which reduces the potential for toxicity problems. Thus, the resin is always under cover in a container during mixing and degassing, and under the vacuum blanket during impregnation of fiber reinforcement and curing. The vacuum can be exhausted in a remote area or gas collector, thus eliminating any obnoxious fumes from the work area. Accordingly, there is provided a toxicity-free working environment. Finally, the invention process permits the manufacture of parts with quality almost equal to autoclave pressure cured or matched press tool molded parts, with the use of relatively inexpensive equipment and tools.

BRIEF DESCRIPTION OF THE DRAWINGS

The invention will be more clearly understood by reference to the description below taken in conjunction with the accompanying drawings wherein:

FIG. 4 illustrates a woven screen element to function as a "mechanical" flow path for liquid resin in conjunction with the bleeder cloth and the fiber reinforcement layup;

FIG. 4A illustrates an alternative "mechanical" resin flow path;

FIG. 5 illustrates the use of spaced parallel rods to form mechanical flow channels for the liquid resin in conjunction with the fiberglass bleeder cloth;

FIG. 5A illustrates yet another means providing resin flow paths;

FIG. 6 illustrates the use of tapered edge frames between the outer edges of the fiber reinforcement and the adjacent vacuum bag to aid in preventing non-uniform flow of liquid resin across the fiber reinforcement;

FIG. 7 illustrates an alternative to the feature shown in FIG. 6, employing a suitable tacky putty-like material, such as a vacuum bag sealant, between the outer edges of the fiber reinforcement and the adjacent vacuum bag, to aid in obtaining uniform flow or impregnation across the fiber reinforcement;

FIG. 8 illustrates the use of a micro-porous filter at the inlet to the vacuum source to permit volatiles but not liquid resin to pass through the vacuum outlet after completion of resin impregnation;

FIG. 9 illustrates the feature of a bleeder tongue communicating at one end with the bleeder cloth and the breather cloth, and at the opposite end with the vacuum outlet, to provide time for gelling of any excess liquid resin exiting the fiber reinforcement and in the tongue, to avoid passage of liquid resin into the vacuum outlet;

FIG. 10 is a prospective view of a foam core having slots in the surfaces thereof to function as resin flow paths for resin impregnation of fiber reinforcement skins to be positioned on the foam core, in producing composite sandwich panels;

FIG. 10A is a longitudinal section of an arrangement including the slotted foam core of FIG. 10, showing the foam core with fiber reinforcement skins on the outer surfaces thereof, mounted on a tool, in relation with other cooperating elements, for resin impregnation of the fiber reinforcement skins;

FIG. 11 illustrates a preferred system for vacuum resin impregnation, particularly across the width of fiber reinforcement according to the invention.

DETAILED DESCRIPTION OF THE INVENTION AND PREFERRED EMBODIMENTS

Figure 1:
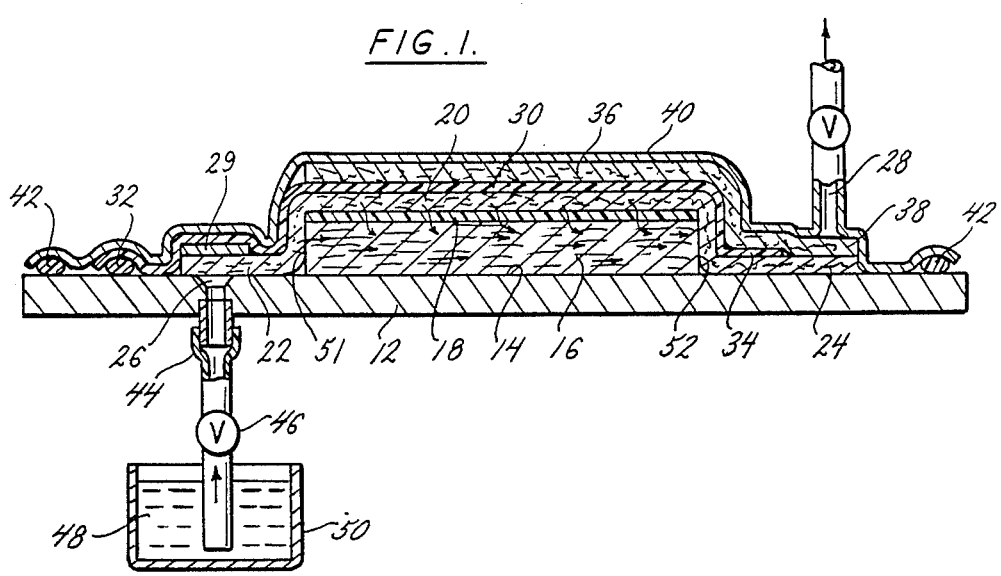
FIG. 1 illustrates one system for carrying out the invention process.

Referring to FIG. 1 of the drawings, numeral 12 represents the base of a tool or mold for impregnating a dry fiber reinforcement with a resin according to the invention. A coating of a mold release material, such as silicone or Teflon emulsion (Freekote 33) can be first applied to the tool surface 14. A dry fiber reinforcement layer or layup 16 is then applied over the coated mold surface. Such fibrous reinforcement can be in the form of dry fibers, woven cloth, braided cloth, knit cloth, mat, stitched layers of material, tow, yarn, tape and the like. Such fiber reinforcement can be either stitched or non-stitched material, that is, it can be in the form of layers of materials that are stitched together, as well as separate layers. Such fiber reinforcement can have a thickness of about 0.005 to over 3 inches. The fiber reinforcement can be comprised of various materials, such as glass fiber, carbon, graphite, boron, aramide, such as the material marketed as Kevlar, and the like. Carbon reinforcement material is particularly preferred due to its high strength and high modulus.

A permeable or porous parting film 18 is applied over the dry fiber reinforcement 16. Such parting film functions to permit liquid resin to flow or pass through the film. For this purpose, various materials can be employed, such as perforated Teflon and Tedlar, the latter two materials being fluorinated hydrocarbons. Silicone rubber films with non-sticking properties can be perforated and made porous to function as permeable parting films. A porous Teflon-coated glass fiber cloth is a specific example of a suitable porous parting film.

Over the parting film 18 is applied a bleeder material 20. The bleeder material can be any non-reacting absorbent material, such as glass fiber cloth, polyester paper, and other non-reactive absorbant materials. The bleeder can be in the form of several layers. Such bleeder material can range from about 0.005 to about 0.1 inch thick. The bleeder material functions as a flow path for passage of liquid resin into and through the porous parting film 18 and into the fiber reinforcement material 16. It is noted that the bleeder cloth 20 extends over and beyond opposite ends of the fiber reinforcement material 16, and the outwardly extending ends 22 and 24 of the bleeder cloth rest on the mold surface 14. As described in greater detail below, it will be noted that the bleeder, e.g., fiberglass cloth, extension or band 22, positioned across the liquid resin inlet 26, and the bleeder cloth, e.g., fiberglass, extension or band 24 placed adjacent the vacuum outlet 28 function as a resin bleed path from the resin inlet line to the fiber reinforcement 16 and from the fiber reinforcement 16 to the vacuum outlet line 28. It is noted that a rigid cover 29 is applied over the outwardly extending end 22 of the bleeder cloth and over the resin inlet 26 to prevent the bleeder cloth from filling in the inlet trough 26 and partially blocking the flow of resin.

A non-porous separator or seal film 30 is next applied over the bleeder material 20. For this purpose, nylon or other non-porous film is used to trap the resin in the fiber reinforcement 16 and the bleeder material 20. The non-porous separator film 30 extends over the outwardly extending band 22 of the bleeder cloth and over the cover 29, adjacent the resin inlet 26 and is attached to the tool surface 14 by a seal 32. The opposite end 34 of the non-porous separator 30 extends over and terminates above the rear band 24 of bleeder material 20 adjacent the vacuum outlet 28.

A breather cloth layer 36 is placed over the non-porous separator film 30 and extends over and makes communication with the exposed bleeder extension or fiberglass band 24 below vacuum outlet 28, as indicated at 38. Such breather material can be composed of glass fiber cloth, polyester paper, and the like, and has an important function, namely, to provide a uniform vacuum pressure and compaction across and along the assembly, and to prevent vacuum block-off of the outer vacuum bag.

A vacuum bag 40 is then placed over the entire assembly and the edges of the vacuum bag are sealed as at 42 to the surface 14 of the tool. The vacuum outlet hose 28 is connected adjacent to the area 38 of the breather cloth 36 at the rear end of the assembly opposite the resin inlet end 26.

A resin inlet hose 44 containing a valve 46 is connected between a resin container 48 and beneath the vacuum blanket directly to the resin inlet 26 under the bleeder band, e.g., fiberglass, 22, at the resin inlet edge of the panel.

A liquid resin 50 is placed in the container 48 for impregnating the fiber reinforcement 16. For this purpose, various resin systems can be employed including epoxy, epoxy novolacs, and other thermosetting resins, such as polyesters, polyimides, both condensation and addition types, phenolic resins, and bismaleimides. An exemplary liquid resin system which can be employed and which is supplied by the Ciba-Geigy Company is as follows:

| COMPOSITION A | |
|---|---|
| 938 Epoxy Resin | 100 parts |
| 906 Hardener | 117 parts |
| Y-064 Accelerator | 1 part |

The resin system should be selected with respect to a particular fiber reinforcement for producing a finished laminate fiber reinforced part with the desired mechanical and environmental properties.

The resin is usually "degassed" (under vacuum) after mixing of the hardener/catalyst in the resin, to eliminate or remove all entrapped air from the liquid resin. The resin should be capable of proceeding through a vacuum pressure cure cycle environment of heat and time without formation of gas bubbles or voids.

Following mixing and degassing, the tube 44 is connected to the resin inlet 26 and immersed in the resin mix 50.

For impregnating the fiber reinforcement 16 with resin according to the invention, a vacuum is first drawn through vacuum hose 28, to draw all of the air out of the fiber reinforcement layer 16 and also out of the bleeder layer 20. The resin in container 50 moves, under pull of the vacuum, to the bleeder band 22 adjacent the inlet end of the layup 16 and is initially distributed throughout the bleeder band 22 transversely across the full width of the fiber reinforcement 16 adjacent to the front edge 51 thereof. The resin will then flow quickly along and through the sacrificial fiberglass bleeder cloth 20, will penetrate the porous parting film 18 below and impregnate the fiber reinforcement 16 by flowing essentially longitudinally therein, as indicated by the arrows. As previously noted, the invention system utilizing resin flow paths, such as the fiberglass bleeder layer 20, is particularly designed for the impregnation of graphite cloth reinforcement or layup for very large composites. It is noted that the liquid resin has only a short distance to travel in the Z direction from the bleeder layer 20 and through the porous parting film 18, to impregnate such graphite cloth layup, as at 16. When upper side vacuum pressure is retained, the resin will impregnate the layup 16 to a saturated, void-free condition.

Prior to drawing vacuum pressure on the layup, the tool is heated, as desired, to control resin viscosity and gel time. Initially, vacuum pressure is drawn on the layup, with the resin inlet valve 46 closed. With assurance of no vacuum leakage, the resin valve is opened, and the resin impregnation into the fiber reinforcement or layup 16 occurs as described above.

Resin impregnation does not cease immediately when the layup 16 is saturated. After the resin inlet valve 46 is closed, there will still be some resin movement from the saturated layup 16 into the adjacent fiberglass bleeder extension 24 at the far end of the layup. For this reason, a bleeder extension 24 of good length should be available extending beyond the far edge 52 of the layup 16 adjacent to the vacuum outlet 28. In this respect, it is noted that the fiberglass bleeder extension 24 is positioned below and communicates with the adjacent extension 38 of the fiberglass breather cloth 36 adjacent the vacuum outlet 28 so that there will be some resin movement from bleeder extension 24 into breather cloth extension 38. The resin gel time is reproducible with proper control of catalyst and temperature and can be designed to accomplish resin gelling, some time between full layup impregnation and impregnation of the bleeder and breather extensions 24 and 38, and before the resin reaches the vacuum outlet 28.

Instead of employing bleeder extensions 22 and 24 adjacent the front and rear edges 51 and 52, respectively, of fiber reinforcement 16, separate pads, e.g., of fiberglass, can be utilized for this purpose, and which are in communication with opposite ends of bleeder 20.

Some resin systems will permit the temperature to be increased at the time of complete impregnation of the fiber reinforcement or layup 16, to accomplish quick resin gelling, with little additional resin flow, and yet obtain a void-free, high quality composite.

After completion of impregnation of the fiber reinforcement 16, with liquid resin, the resin inlet valve 46 is closed, and the cure cycle is completed under vacuum pressure only, and with time and temperature appropriate for the particular resin system.

The resin system can be designed to have a time period of low viscosity, prior to resin gel and cure, ranging from a few minutes to several hours. This is in order to obtain different impregnation times for different size parts. Small parts should be impregnated and cured in a few minutes and large parts in several hours.

After curing, the vacuum is removed and the vacuum bag 40 is removed and the assembly on the tool is dismantled. The sacrificial bleeder layer 20 and the porous parting film 18 can be stripped from the finished composite formed of the resin impregnated, cured fiber reinforcement 16.

Woven graphite cloth can be used as fiber reinforcement in the form of a "tight" fiber bundle structure. This tight structure has poor resin wetting characteristics compared to fiberglass and allows only limited area resin impregnation. The incorporation of 10 to 20 percent uniform or specific area distribution of fiberglass within the woven carbon cloth will greatly improve the resin impregnation area capability, although with some loss of mechanical properties. An example of such material is the woven reinforcement material of U. S. Pat. No. 4,368,234 to Palmer, et al, comprised of woven bands of carbon fibers separated by woven bands or strips of glass fibers. The glass fibers in such carbon reinforcement materials provide flow paths for the liquid resin, in which case the sacrificial bleeder cloth 20, which provides liquid resin flow paths, can be deleted. However, when employing carbon fiber reinforcement, in the absence of the fiberglass bleeder layer 20, providing a resin flow path, and in the absence of fiberglass strips or dispersions within the carbon fiber reinforcement to provide resin flow paths, it has been found that large parts or pieces of carbon fiber reinforcement cannot be properly impregnated with liquid resin, since after only a portion of the carbon fiber reinforcement becomes impregnated with liquid resin, vacuum is blocked off, sealing the carbon fiber reinforcement from further impregnation, and preventing formation of a uniformly fully impregnated carbon fiber reinforcement.

Figure 1A:
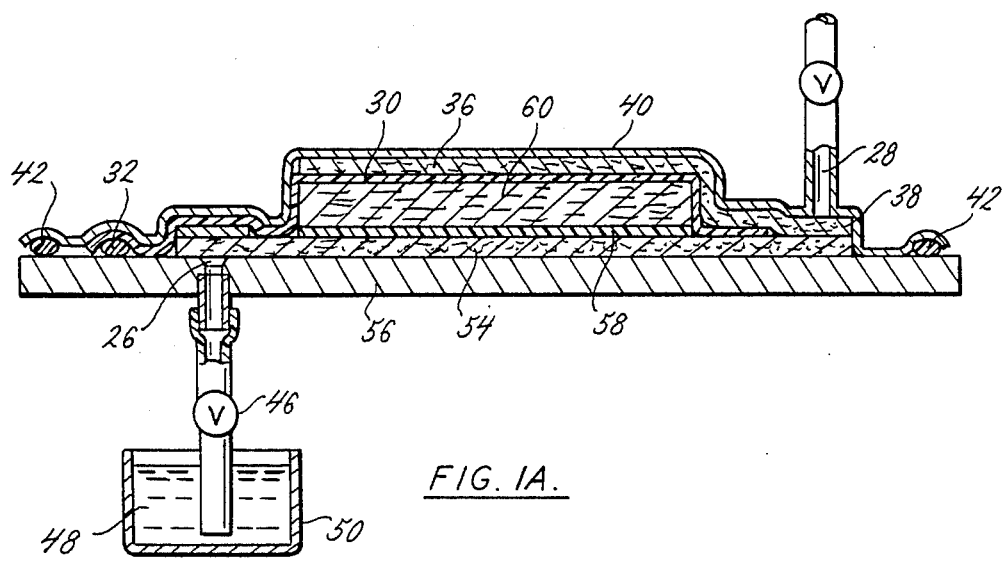
FIG. 1A illustrates an alternative arrangement of the system of FIG. 1.

As an alternative to placement of the porous parting film 18 and the bleeder layer 20, e.g., of fiberglass cloth, above the fiber reinforcement 16, as illustrated in FIG. 1A, fiberglass bleeder cloth 54 can be applied on the surface of the tool 56, a porous parting film 58 applied over the bleeder layer 54, and the fiber reinforcement layer 60 disposed over the porous parting film 58 and the bleeder layer 54. Further, if desired, a porous parting film and the bleeder layer can be disposed both above and below the fiber reinforcement layer to provide additional liquid resin flow paths.

Figure 2:
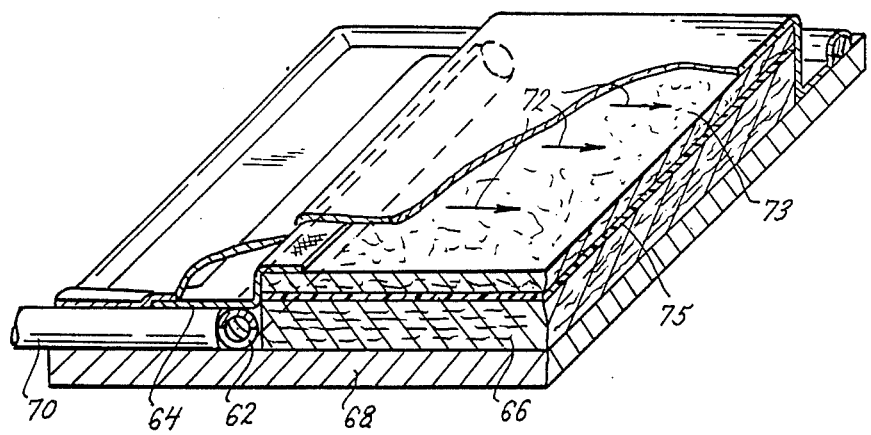
FIG. 2 illustrates certain alternative invention features for rapidly transferring incoming liquid resin the full edge width of the panel or of the fiber reinforcement layer.
Figure 2A:
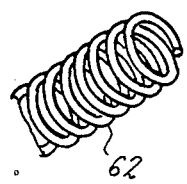
FIG. 2A illustrates use of a coiled wire element for receiving liquid resin in the arrangement of FIG. 2.

Referring to FIGS. 2, 2A, 2B and 2C, in place of employing a fiberglass band, such as the fiberglass extension 22 of the bleeder 20, as shown in FIG. 1, to spread the resin flow from the resin inlet 26 for the full width of the fiber reinforcement layer 16 transversely from edge to edge thereof, there can be employed other mechanical arrangements. Thus, as seen in FIG. 2, there can be employed a coiled wire 62 covered with fiberglass cloth 64 transversely across the fiber reinforcement or layup 66 on the tool 68. The liquid resin inlet tube 70 terminates adjacent the fiberglass-covered coiled wire 62 so that liquid resin entering from tube 70 is spread by the fiberglass-covered coiled wire transversely of the assembly from edge to edge of the fiber reinforcement layup 66, and the spreaded liquid resin then flows longitudinally as indicated by arrows 72 along the fiberglass bleeder layer 73, similar to 20 in FIG. 1 and then through porous parting film 75 into the fiber reinforcement layer 66 from edge to edge thereof.

Figure 2B:
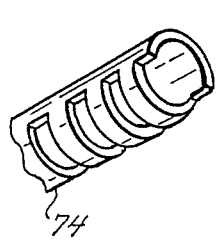
FIGS. 2B and 2C illustrate alternative slotted tube and slotted channel elements which can be used in place of the coiled wire resin receiving member of FIGS. 2 and 2a, for distributing liquid resin the full width of the panel.
Figure 2C:
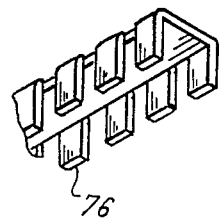

As an alternative to the coiled wire 62, as illustrated in FIGS. 2B and 2C, there can be employed a slotted tube 74 or a slotted channel member 76, coated with fiberglass cloth (not shown), to facilitate resin flow from edge to edge of the bleeder and fiber reinforcement layers.

Figure 3:
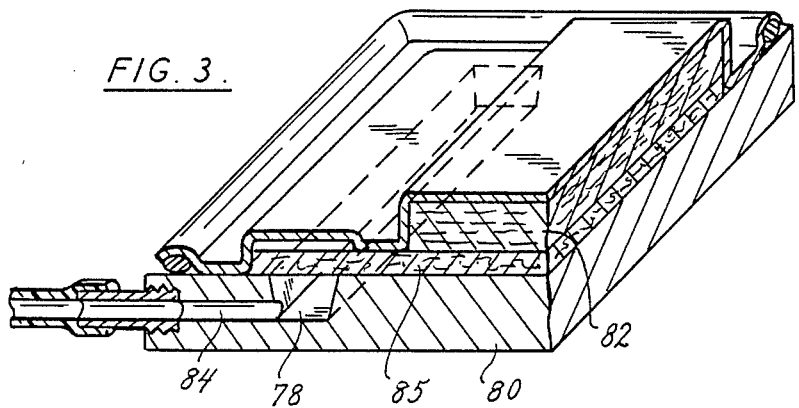
FIG. 3 illustrates use of a tapered slot in the tool to form a channel for receiving incoming liquid resin.

Referring now to FIG. 3, alternatively to the bleeder band 22 of FIG. 1 or to the use of the coiled wire, slotted tube or slotted channel covered with fiberglass cloth of FIGS. 2, 2A, 2B and 2C, there can be employed a tapered slot 78 in the tool 80 across one end of the fiber reinforcement layup 82, to receive liquid resin from the inlet 84 to spread the liquid resin across the layup from edge to edge thereof prior to longitudinal flow of the liquid resin into and through the layup. The tapered slot 78 is covered with fiberglass cloth 85 to provide the resin flow path.

Although sacrificial, e.g., fiberglass, bleeder cloth improves the area and rate of resin impregnation into the fiber reinforcement, it has been found that the rate of resin impregnation can be further substantially increased by providing additional resin flow paths to and into the fiber reinforcement layer along the length thereof. Referring now to FIG. 4, a woven screen 86 can be disposed over the bleeder cloth surface indicated at 88 above fiber reinforcement layer 87, and beneath the vacuum bag surface indicated at 89, and providing void areas 90 functioning as resin fluid channels between filaments 92.

Alternatively, viewing FIG. 4A, a non-crimp knit woven screen 94 can be employed above the bleeder surface 96 and fiber reinforcement layer 97, to provide multiple resin flow channels 98 between filaments 100.

The screen of FIGS. 4 and 4A can be constructed of any suitable material, such as aluminum, fiberglass, Teflon or other plastic, or rubber.

Now referring to FIG. 5, a mechanical resin flow channel arrangement 102 can be provided in the form of aluminum, Teflon, or silicone rubber rods 104 placed in parallel transverse spaced relation in the direction of desired resin flow and over the fiberglass bleeder cloth 106 on the porous parting film 108 covering the fiber reinforcement 110, with the vacuum bag 112 over the rods 104. This arrangement provides additional resin flow channels 114 between the rods 104 and the vacuum bag 112 when vacuum is applied to pull the bag to the tool.

Instead of the use of a screen as in FIGS. 4 and 4A, or the use of rods as in FIG. 5, referring to FIG. 5A, a plate, e.g., a metal plate, 116 having a plurality of grooves 118 therein, can be disposed over the bleeder layer indicated at 120, providing resin flow channels in the grooves adjacent the bleeder cloth for passage of resin through the bleeder cloth, porous parting film 121 and fiber reinforcement layer 123.

It has been found that the liquid resin tended to flow along the longitudinal edges between the fiber reinforcement and the sealed edges of the vacuum bag more rapidly than in the central portions of the fiber reinforcement longitudinally thereof. Thus, some difficulty was experienced in obtaining uniform resin flow across the entire width of the bleeder and the fiber reinforcement as the resin flowed longitudinally thereof. Thus, resin would at times flow at a much faster rate along one edge of a fiber reinforcement panel where the vacuum bag would leave a small resin flow channel adjacent the closed sealed edges thereof on the tool.

Such non-uniform flow along the panel and fiber reinforcement edges has been overcome according to one embodiment, as shown in FIG. 6, by trimming the edges of the fiber reinforcement 126 square, as indicated at 124, and incorporating a tapered edge frame seal 122 on the tool 130 between the outer edges 124 of the fiber reinforcement 126 and the adjacent vacuum bag 128 on the tool 130, the vacuum bag overlying porous separator film 125 and bleeder cloth 127. The edge frame material 122 can be flexible, e.g., silicone rubber, or rigid, e.g., Teflon or metal. The vacuum bag 128 will then form a tight seal around the fiber reinforcement panel 126. Alternatively to the tapered edge frame of FIG. 6, according to the embodiment of FIG. 7, a bead of non-flowing putty, i.e., vacuum bag sealant putty, at 132, can be incorporated along the side edges 124 of the fiber reinforcement layup 126 and thus sealing the vacuum bag 128 to the sealant.

It has been a concern that during vacuum impregnation of a fiber reinforcement, according to the invention, excess resin will flow through and out of the fiber reinforcement or layup and past the excess bleeder cloth before gelling, and on into the vacuum line and into the vacuum pump. Such excess resin would not only severely damage the vacuum pump, fill the vacuum line, and cause waste of resin, but also will cause a loss of vacuum pressure and result in a poor quality resin impregnated layup.

This problem can be alleviated, viewing FIG. 8, by incorporating a micro-porous ceramic filter 134 in the vacuum line 136 or adjacent to the vacuum line. Thus, in conjunction with the embodiment of FIG. 1A, any excess liquid resin following impregnation of the fiber reinforcement 138 and passing through the bleeder cloth 140 around the outer edge of the non-porous seal film 142 and into the breather cloth 144 adjacent the vacuum outlet will be blocked from passing into the vacuum line by the filter 134. Thus, such filter will allow volatiles to pass but will not pass the liquid resin.

In a preferred alternative embodiment to the use of the ceramic filter of FIG. 8, viewing FIG. 9, an extension or tongue of bleeder material, e.g., fiberglass cloth, indicated at 146, extends at one end from the outer edge of the bleeder cloth 148 and from the breather cloth 150 beneath the vacuum bag 152, a substantial distance to the vacuum outlet 154. Thus, a vacuum is pulled from 154 through the tongue 146, so that any liquid resin which exits the outer edge 156 of the bleeder cloth 148 and the breather cloth 150 will pass into and through the extended tongue 146 and will impregnate and gel within the bleeder cloth 146 before any liquid resin reaches the vacuum outlet 154, thus preventing passage of liquid resin into the vacuum line 154 while permitting volatiles to pass into the vacuum line. This arrangement will be described in greater detail with respect to the embodiment of FIG. 11.

Composite sandwich panels with thin fiber reinforcement skins are widely used for lightly loaded structures. The skins, positioned on foam core, such as polyurethane or thermoplastic-type foam, are usually very thin, and it is difficult to impregnate large areas of the skins. Referring to FIG. 10, there is shown a foam core 158 having a plurality of parallel longitudinal grooves 160 in the upper surface 164, criss-crossed by a plurality of transverse grooves 162. Similarly, a plurality of longitudinal and transverse grooves 160 and 162 are disposed in the lower surface 166 of the foam core. Such grooves can be machined or cut into the foam core on the upper and lower surfaces, forming mechanical resin flow channels therein.

Viewing FIG. 10A, showing the use of the foam core 158 for resin impregnation of carbon cloth reinforcement skins thereon, a fiber reinforcement layer, such as a carbon cloth skin 168, can be disposed over the upper surface 164 of the foam core 158, and a carbon cloth skin 170 can be positioned against the lower surface 166 of the foam core 158. The provision of the resin flow channels formed by grooves 160 and 162 in the foam core 158 achieves large area, rapid impregnation of the carbon cloth skins on both surfaces of the sandwich at the same time in the manner described below.

It is noted in FIG. 10A that the upper carbon cloth skin 168 and the lower carbon cloth skin 170 both extend outwardly for a distance beyond the foam core 158 on opposite ends thereof to form skin flanges 179, and the lower skin 170 is in contact with a tool 179'. A slotted resin inlet spreader tube 171 is located adjacent to and abutting the edges of the flanges 179 of panel skins 168 and 170 at the front end thereof, to allow direct communication of the incoming resin to the front edges of the panel skins.

A porous separator film 173 is located over the complete layup including the upper skin 168 and the slotted resin inlet spreader tube 171, and past the opposite edge of the panel skins to the vacuum line 175 located at the outer end thereof. A wire screen 177 is positioned on the porous separator ply 173 over all areas of the flanges 179 of the skins 168 and 170, between the ends of the flanges, and the foam core 158. A bleeder cloth 181, e.g., fiberglass, is located over the wire screen 177, over the resin spreader 171, up the inclined ramp and over the foam core 158, and past the opposite ends of the carbon cloth skin flanges 179 to the vacuum outlet line 175.

Fluid resin communication is accordingly obtained between the slotted resin inlet spreader tube 171, and the bleeder cloth 181 and wire screen 177, via the inner skin flanges 179, to minimize any restrictions to flow of liquid resin uniformly into and through the carbon cloth skins 168 and 170 along the length thereof and transversely thereof. The grooves 160 and 162 in the foam block 158 form additional resin flow channels to further facilitate flow of liquid resin uniformly into the carbon cloth skins 168 and 170 in the manner noted below.

A tube 183 leads from the resin inlet fitting 185 to the liquid resin-containing bucket 187. A valve 191 is provided in the line 183 to control timing for the start and stop of resin flow.

A non-porous seal film 199 is placed over the entire layup and over the bleeder cloth, but the end 201 of the seal film does not extend below the outlet port of vacuum outlet line 175. The seal film 199 is sealed to the tool 179' by a sealant 203 on all sides of the panel except at the end 201 near the vacuum outlet. A layer of breather cloth 205 is placed over the entire assembly past the edge 201 of the seal film 199, to make contact with the exposed adjacent end of bleeder cloth 181 under the vacuum outlet port of vacuum line 175. A vacuum bag 193 is placed on the entire assembly and sealed to the surface of the tool 179' by sealant at 195. The vacuum line 175 connected to a vacuum source communicates with the interior of the vacuum bag.

Under pull of the vacuum in line 175, and with valve 191 open, liquid resin flows through the slotted resin inlet tube 171 and via the adjacent inner skin flanges 179, into and through the bleeder cloth 181, wire screen 177, porous separator 173, and through the upper carbon cloth skin 168 and into grooves 160 and 162 along the top, the inclined sides 197, and the bottom of the foam core 158. The liquid resin flows at the same time from the grooves in the bottom of the foam core into and through the lower carbon cloth skin 170. This results in uniform impregnation of both skins 168 and 170.

The tool is normally heated prior to the start of resin impregnation to a prescribed temperature, such as 200°–250°F., to achieve the desired resin viscosity, and the resin is catalyzed to achieve resin gel and cure only after a prescribed impregnation time has passed, usually between about 30 and 60 minutes. The temperature may be increased, after impregnation, to shorten time for complete resin cure.

After removal of the vacuum bag 193, breather cloth 205 and seal film 199, the wire screen 177, bleeder cloth 181, and the porous separator film 173 are stripped away. This process can produce a variety of panels having high quality uniform thickness, resin-impregnated fiber reinforcement skins.

FIG. 11 illustrates a preferred embodiment for across the width impregnation according to the invention.

A graphite cloth 172 comprised of eight layers of bi-woven 8 harness satin-weave graphite cloth, each ply having a thickness of 0.013", is applied as fiber reinforcement material on the tool 174. One layer of porous parting film 176 comprised of permeable Armalon, a glass fiber coated with fluorocarbon, is then applied over the fiber reinforcement to function as a separator between the fiber reinforcement layer and the subsequently applied bleeder cloth.

A fiberglass bleeder cloth 178 is applied over the parting film 176 to provide a portion of a resin flow path to the fiber reinforcement layup 172.

A woven wire screen 180 is applied over the fiberglass bleeder 178 to function as a mechanical flow path for the liquid resin in conjunction with the fiberglass bleeder 178.

A non-porous nylon seal film 182, 0.002" thick, is placed over the wire screen 180 and is sealed to the tool 174 at 184, as with masking tape.

A glass fiber breather cloth 186 is then placed over the non-porous film 182. The breather cloth provides uniform compaction throughout the total processing cycle.

At the inlet end for resin flow, initially across the entire lay-up 172, there is provided a slotted tube 188, of the type illustrated in FIG. 2B, positioned transversely across the layup 172, adjacent and parallel to the front edge 189 thereof, and a liquid resin inlet tube 190 suspended in a container of liquid resin 200, and having a valve 202, communicating with one end of the interior of the slotted tube 188.

An additional layer of fiberglass 204 is positioned around the upper peripheral surface of the slotted tube 188, and it is noted that one end 206 of the fiberglass bleeder 178 and the adjacent end 208 of the wire screen 180 are disposed around the lower peripheral surface of the slotted tube 188 to insure a continuous resin fluid flow path from the interior of the slotted tube through the slots thereof to the wire screen 180 and to the fiberglass bleeder 178.

A vacuum bag 210 is then applied over the entire assembly and the edges of the vacuum bag sealed as at 212 to the tool. A nylon bag, 0.002" thick, or silicone rubber are suitable vacuum bag materials.

It is noted that at the opposite end of the assembly, a hole 214 is provided in the non-porous seal film 182 to provide resin flow communication between the resin exit end of the fiberglass bleeder 178 and the adjacent exit end of the breather cloth 186.

There is also provided an extension or tongue of fiberglass 216 communicating with the exit end of the fiberglass breather cloth 186 and extending over a substantial length, as illustrated at 146 in FIG. 9, the opposite end of the tongue 216 communicating with a vacuum outlet 218.

Using the epoxy resin system of Ciba-Geigy Company, set forth above as composition A, the components of the liquid resin are mixed at room temperature and the liquid resin is degassed. The arrangement of FIG. 11 is heated, e.g., to about 250° F., to control resin viscosity and provide suitable resin flow and gel time following complete penetration or saturation of the graphite reinforcement 172. The liquid resin flows through the resin inlet line 190 at room temperature and first encounters the 250° F. temperature as it reaches the tool. Vacuum pressure is then drawn through vacuum line 218, with the resin inlet valve 202 in closed position. With assurance of no vacuum leakage, the resin valve 202 is opened, and the resin flows through the inlet tube 190 into the slotted tube 188 along the length thereof.

The resin then flows through the slots of tube 188 into the wire screen 180 and the fiberglass bleeder 178, and proceeds through the porous parting film 176 into the graphite cloth or layup 172. The resin impregnates the layup 172 from the resin inlet end to the opposite end of the layup.

Following such resin impregnation and saturation of the layup 172, the resin inlet valve 202 is closed. While gelling of the resin in the layup 172 has commenced, there is still some liquid resin movement out of the layup 172 and into the adjacent far end 220 of the fiberglass bleeder 178. Such excess resin can then flow through the hole 214 in the non-porous seal film 182 and into the adjacent end 222 of the breather cloth 186.

Such excess resin can then flow through the fiberglass extension or tongue 216 over the length thereof before reaching the vacuum outlet 218. The resin gel time is designed to accomplish gelling some time between full layup impregnation and before the resin reaches the far end of the fiberglass tongue 216 at the vacuum outlet 218.

After completion of the resin impregnation of the graphite cloth layup 172, the assembly is heated to a temperature of about 350° F., and the cure cycle is completed under vacuum pressure for a period of about 2 hours.

The vacuum is then cut off, and the vacuum bag 210 is removed from the assembly, followed by removal of breather cloth 186, non-porous seal film 182, and wire screen 180. The assembly of the layup 172, porous parting film 176, and fiberglass bleeder 178 can then be removed from the tool, and the fiberglass bleeder 178 and porous parting film 176 can then be stripped from the layup 172.

Instad of employing an extension or tongue of fiberglass 216, any equivalent porous material can be employed to provide a resin exit flow path in communication with the graphite cloth layup 172 for absorbing any excess liquid resin from such layup following resin impregnation thereof.

In FIGS. 12, 13, 14 and 15, there is shown a system utilized in a modified form of the invention process termed herein a "through the thickness impregnation process", which involves resin flow and impregnation along the length and width of the fiber reinforcement, and also through the thickness thereof. This modified process and system does not require the resin to flow great distances across and through the fiber preform or reinforcement to obtain complete area impregnation, and hence, the present modification permits the impregnation of large area fiber preforms for the production of large area fiber reinforced resin panels, as for the production of large aircraft.

Figure 12:
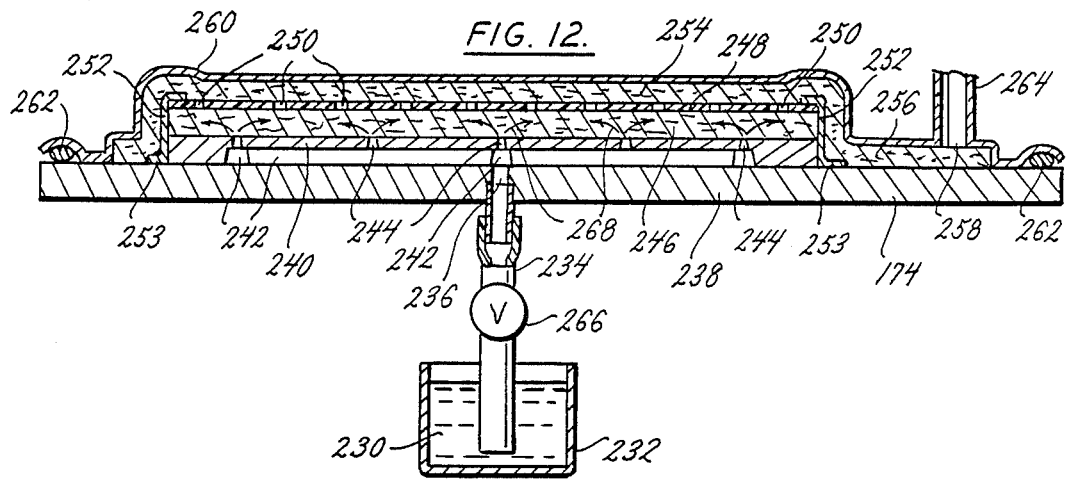
FIG. 12 illustrates another modification of a system for resin impregnation along and through the thickness of a fiber reinforcement particularly applicable for fabrication of large parts, according to the invention.

Referring particularly to FIG. 12, liquid resin at 230 is placed in a resin container 232 for communication via resin hose 234 through a central inlet 236 in a tool base 238. The resin is usually a fluid of fairly low viscosity (less than 1000 cp) at room temperature. Some resins may be heated in the container to lower resin viscosity. A Dow Taxtic 123 resin, with H-41 hardner, is an example of a resin system that will perform without heat in the container.

Figure 13:
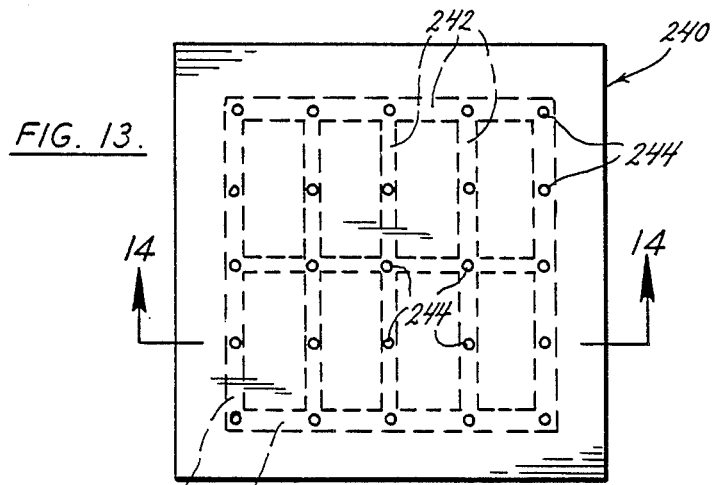
FIG. 13 is a plan view of the runner plate employed in the system of FIG. 12.
Figure 14:
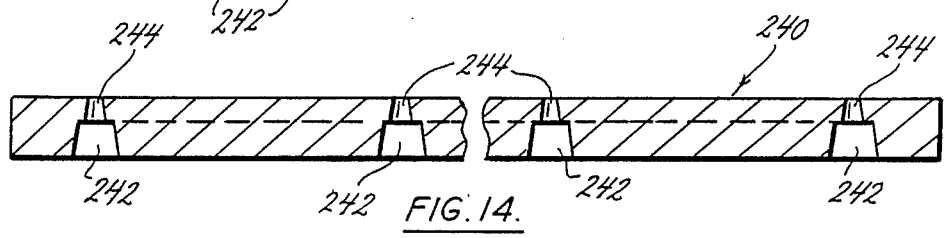
FIG. 14 is a cross-section of the runner plate of FIG. 13, taken on line 14—14 of FIG. 13.

A caul plate 240 is positioned on the tool base plate 238, the caul plate having a plurality of lower surface runner channels 242 extending longitudinally and transversely across the caul plate, as seen particularly in FIGS. 13 and 14, with upper outlet holes 244 from the runners. This arrangement permits achievement of rapid resin flow through the runners across the total area of the panel from the resin port 236 and through the outlets 244 to the upper surface of the caul plate. It is noted that the runners 242 and outlet holes 244 are tapered to allow easy removal of resin after the cure is completed.

Figure 15:
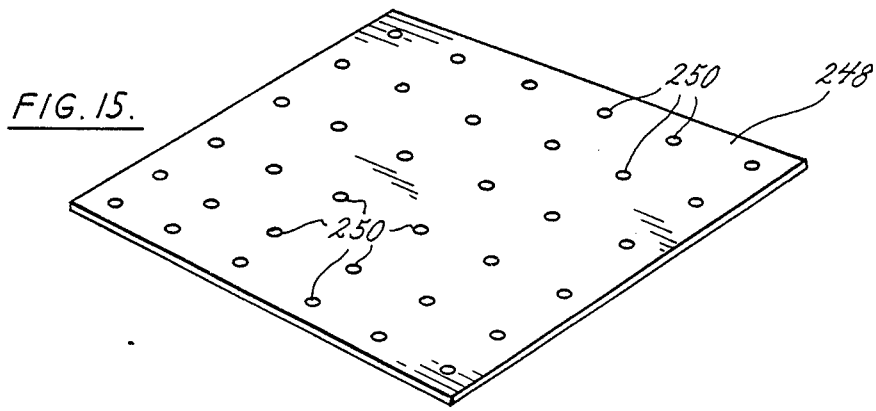
FIG. 15 is a perspective view of the apertured pressure plate used in the system of FIG. 12.

A dry fiber preform or layup 246 is placed on the upper surface of the runner caul plate 240. It is noted that both the base tool 238 and the runner caul plate 240 can be coated with a suitable mold release agent. Referring also to FIG. 15, an upper pressure plate 248 is located over the dry fiber preform 246, such pressure plate having holes 250 therein offset from the outlet holes 244 in the lower runner plate 240. The upper pressure plate 248 is sealed on all sides at 252 to the base plate 238 at 253 to form a cocoon between the base plate and the upper pressure plate 248, with the dry preform 246 and the lower runner caul plate 240 inside the cocoon. Heat resistant pressure sensitive adhesive tape can function as the seal element 252.

A bleeder cloth 254, e.g., fiberglass, is located over the cocoon assembly and extends at one end 256 along the surface of the base tool 238 away from the cocoon, to the area of a vacuum outlet 258. A vacuum bag 260, e.g., nylon, is placed over the entire assembly and sealed to the base tool 238 with vacuum bag seal putty at 262 on all sides of the assembly. The vacuum outlet 258 is located in the vacuum bag 260 over the outer end of the bleeder cloth 256 away from the cocoon, and a vacuum line 264 runs to a vacuum source.

In operation, the resin employed in the process must pass through a low viscosity phase for a controlled period of time prior to resin gel, such as to allow the resin sufficient time to impregnate the fiber preform. The proper control of catalyst, heat or temperature, and time can control the resin viscosity and gel time to the desired workable limits. In usual practice, the tool and layup assembly are placed in an oven and the tool heated to a desired temperature, preferably the resin final curing temperature. Vacuum is drawn on the panel, but the line to the resin pot 232 is closed by the valve 266 in the resin hose 234. This draws any moisture out of the layup or preform 246. The resin pot 232 is usually outside the oven and at room temperature. Alternatively, the tool can be a self-heated tool, thus omitting the use of an oven.

The valve 266 in the resin hose 234 is opened, after the tool is at the desired temperature, and the vacuum will pull the resin through the connecting hose 234 into and along the runners 242 in the resin caul plate 240, up through the outlet holes 244 in the runner plate, into and through the length and thickness of fiber preform 246, up through the offset holes 250 in the upper pressure plate 248, and into the bleeder cloth 254. It will be noted that as a result of the offset arrangement of the holes 250 in the upper pressure plate 248, with respect to the upper outlet holes 244 in the runner plate 240, the liquid resin as it passes through and permeates the fiber preform 246, traverses longitudinally and transversely a short distance through the fiber preform, as indicated by the arrows 268 from the outlet holes 244 in the runner plate 240, to the offset inlet holes 250 in the pressure plate 248. Thus, although it will be noted that the resin passes both longitudinally and transversely through the fiber preform, as in the previously described embodiments, in the present embodiment the resin only traverses very short distances longitudinally and transversely through the fiber preform, thus enabling impregnation of large area fiber preforms rapidly and thoroughly, resulting in low cost tooling and low cost fabrication for the production of large area cured panels.

The resin should have a viscosity such that it will gel soon after it begins to reach the bleeder cloth 254. The tool or oven temperature can be raised to hasten resin gelling, provided the additional heat does not cause the resin to bubble and make a porous laminate. The cure cycle should be completed with only vacuum pressure required.

Resin flow can be enhanced by applying some pressure such as 5 to 7 psi from the resin pressure pot and still only use vacuum bag pressure overall on the part.

However, such extra pressure is usually not required with the resin runner system under the lower runner plate.

The resin impregnation process described above and illustrated in FIGS. 12 to 15 has a number of advantages. Thus, this modification does not require the resin to flow great distances across and through the fiber preform to obtain complete area impregnation, and hence, resin systems with higher viscosity can be utilized. Panels with varying thicknesses can be better controlled to obtain uniform overall resin impregnation by varying the size of the flow path runners on the underside of the lower caul plate. Resin impregnation is faster than the across the entire length and width method in that the resin flows very quickly in the runner system under the lower caul plate and only has to impregnate along a short length laterally of the fiber preform and up through the thickness thereof. The process can be easily scaled up to make very large area parts requiring no more than vacuum bag pressure.

The invention of this application accordingly provides procedure and a system for impregnation, particularly of large components formed of carbon fiber cloth reinforcement. The present invention process facilitates flow of liquid resin into such fiber reinforcement rapidly and without loss of resin material and without fouling vacuum lines with excess liquid resin. The process of the present invention particularly affords uniformity of thickness of resin impregnation into the fiber reinforcement. Further advantages of the invention process and system include improved quality of composites produced, relatively simple equipment for carrying out the process, and relatively low equipment and tool costs. The process is particularly advantageous for fabrication of large components with thickness and/or resin content control, from fiber reinforcement, e.g., of fiberglass, Kevlar or graphite.

Although particular embodiments of the invention have been described for purposes of illustration, it will be understood that various changes and modifications within the spirit of the invention can be made, and the invention is not to be taken as limited except by the scope of the appended claims.

What is claimed is:

1. A process for vacuum impregnation of a fiber reinforcement with a resin to produce a resin-fiber composite which comprises:
    applying a dry fiber reinforcement layer on a tool,
    placing a porous parting film over said fiber reinforcement layer,
    positioning a bleeder layer over said porous film, said bleeder layer providing a resin flow path,
    applying a non-porous seal film over said bleeder cloth,
    applying a breather layer over said non-porous seal film,
    applying a vacuum bag over the entire assembly,
    providing a source of liquid resin and a resin inlet line to one end of the assembly and communicating with said bleeder layer,
    providing a source of vacuum communicating with said vacuum bag via a vacuum outlet line adjacent the other end of said assembly,
    drawing a vacuum to permit passage of the liquid resin through said resin inlet line,
    spreading the resin flow from the resin inlet line for the full width of said fiber reinforcement layer transversely from edge to edge thereof,
    flowing said resin through a path defined by said bleeder layer, and
    flowing said resin from said bleeder layer through said fiber reinforcement layer, to provide substantially uniform impregnation thereof.

2. The process of claim 1, said spreading of the resin flow from the resin inlet line being provided by passage of the liquid resin through a band of fiberglass cloth positioned transversely on said tool on said one end of said assembly adjacent one end of said fiber reinforcement layer, said band of fiberglass cloth being in communication with said bleeder layer.

3. The process of claim 1, said spreading of the resin flow from the resin inlet line being provided by passage of the liquid resin through resin flow spreading means comprising a coiled wire spring, a slotted tube, a slotted channel, or a slot in said tool, positioned transversely of said tool at said one end of said assembly adjacent one end of said fiber reinforcement layer, said resin flow spreading means being in communication with said bleeder layer.

4. The process of claim 1, said fiber reinforcement layer comprising a carbon fiber layer, and said bleeder layer comprising a fiberglass cloth.

5. The process of claim 1, said fiber reinforcement layer comprising woven carbon cloth having fiberglass distributed therein, to provide resin flow paths in said carbon cloth.

6. The process of claim 1, and including means to provide additional resin flow paths along the length of said fiber reinforcement layer, said additional means being in communication with said bleeder layer.

7. The process of claim 6, said means to provide additional resin flow paths comprising a screen, a plurality of spaced rods providing flow channels, or a plate containing grooves, positioned over said bleeder layer.

8. The process of claim 1, and including placing a micro-porous ceramic filter in the vacuum outlet line to permit passage of volatiles but not liquid resin.

9. The process of claim 1, and including placing a bead of vacuum bag sealant putty on the tool adjacent the side edges of the fiber reinforcement layer and sealing the non-porous seal film to said sealant putty to obtain uniform resin flow across the width of the panel.

10. The process of claim 1, and including trimming the edges of the fiber reinforcement layer square, sealing the non-porous seal film to the tool adjacent said trimmed edges, and placing a seal material between said trimmed edges and the non-porous seal film to obtain uniform resin flow across the width of the panel.

11. The process of claim 1, including providing a resin exit flow path in communication with said fiber reinforcement layer, for absorbing any excess liquid resin from said fiber reinforcement layer following resin impregnation thereof.

12. The process of claim 1, said breather layer being in fluid communication with said bleeder layer at said other end of said assembly, and including providing a tongue of porous material extending from said breather layer at said other end of said assembly, said vacuum outlet line connected to said tongue of porous material adjacent the outer end thereof, said tongue absorbing any excess liquid resin from said fiber reinforcement layer and said excess liquid resin gelling therein and thus preventing flow of liquid resin into the vacuum outlet line.

13. A vacuum impregnation process for producing a resin-fiber composite which comprises:

forming an assembly comprising a fiber reinforcement layer, a porous parting film, a bleeder layer, a non-porous seal film, and a breather cloth, on the surface of a tool, placing a vacuum bag over the assembly and sealing the vacuum bag to the surface of the tool, applying a vacuum to the zone beneath said vacuum bag, feeding liquid resin from a container to an inlet at one end of said assembly, spreading the liquid resin flow at the inlet the entire width of the fiber reinforcement layer transversely from edge to edge thereof, passing the spreaded liquid resin flow longitudinally into and through the bleeder layer, and then passing the liquid resin from said bleeder layer through said porous parting film and into and through said fiber reinforcement layer to impregnate same, providing an extension of said breather cloth at the other end of said assembly and terminating at a vacuum outlet, said bleeder layer being in fluid communication with said breather cloth and said breather cloth extension at said other end of said assembly, and passing excess liquid resin through said breather cloth extension, the resin gel time being controlled so that the resin gels in the fiber reinforcement layer and in the breather cloth extension before any resin reaches the vacuum outlet.

14. The process of claim 13, said fiber reinforcement layer being a carbon cloth, said bleeder layer being a fiberglass cloth, and said breather cloth and breather cloth extension being a fiberglass cloth.

15. A vacuum impregnation process for producing a resin-fiber composite which comprises:
   applying a carbon cloth reinforcement layer on the surface of a tool,
   applying a porous parting film over said reinforcement layer,
   placing a fiberglass bleeder layer over said porous parting film,
   applying a mechanical resin flow path means over the bleeder layer,
   applying a non-porous seal film over said mechanical flow path means,
   positioning a breather cloth over said non-porous seal film,
   placing a liquid resin spreader adjacent one end of said carbon cloth reinforcement layer and said fiberglass bleeder layer, for spreading liquid resin flow across the entire width of the carbon cloth reinforcement layer from edge to edge thereof,
   applying a vacuum bag over the entire assembly and sealing said vacuum bag along sealing edges on the tool surface, adjacent said carbon cloth reinforcement layer,
   feeding liquid resin from a container to an inlet in said liquid resin spreader,
   passing the spreaded liquid resin flow longitudinally into and through said mechanical flow path means and said fiberglass bleeder layer,
   passing the liquid resin from said bleeder layer through said porous parting film and into and through said carbon cloth reinforcement layer to impregnate same,
   providing a hole in said non-porous seal film adjacent the other end of said carbon cloth reinforcement layer, to afford liquid resin communication between said bleeder layer and said breather cloth,
   providing an extension of said breather cloth, said extension terminating at a vacuum outlet,
   passing excess liquid resin from said carbon cloth reinforcement layer and from said bleeder layer through said hole in said non-porous separator film, and through the fiberglass extension of said bleeder,
   the resin gel time being controlled so that the resin gels in the carbon cloth reinforcement layer and in the breather cloth extension before any resin reaches the vacuum outlet.

16. The process of claim 15, said liquid resin spreader being in the form of a slotted tube, and including placing fiberglass cloth around said slotted tube.

17. The process of claim 15, said mechanical flow path means being a wire screen or a plurality of spaced rods providing liquid resin flow channels.

18. The process of claim 15, said breather cloth and said breather cloth extension being fiberglass cloth.

19. A process for vacuum impregnation of a fiber reinforcement on a supporting block to produce a sandwich panel which comprises:
   providing a supporting block having grooves in the surfaces thereof,
   placing a dry fiber reinforcement layer on said block,
   placing the block covered with said fiber reinforcement layer on a tool,
   positioning a porous separator film over said fiber reinforcement layer,
   applying a bleeder layer over said porous film,
   placing a non-porous seal film over said bleeder layer,
   placing a layer of breather cloth over the entire assembly,
   applying a vacuum bag over the entire assembly,
   providing a source of liquid resin and a resin inlet line to one end of the assembly and communicating with said bleeder layer,
   providing a source of vacuum communicating with said vacuum bag via a vacuum outlet line adjacent the other end of said assembly, the outlet port of said vacuum outlet line communicating with said layer of breather cloth and said bleeder layer, both extending beyond the outer end of said seal film,
   drawing a vacuum to permit passage of the liquid resin through said resin inlet line,
   flowing said resin through a path defined by said bleeder layer,
   flowing said resin from said bleeder layer through and along said fiber reinforcement layer, and
   flowing said liquid resin from said fiber reinforcement layer into said grooves of said supporting block and from said grooves back into said fiber reinforcement layer.

20. The process of claim 17, said seal film exposing said bleeder layer beyond the outer end of the seal film, said breather cloth extending past the outer end of said seal film and in contact with the exposed end of said bleeder layer, and wherein the outlet port of said vacuum outlet line is positioned over the contacting ends of said layer of breather cloth and said bleeder layer beyond the outer end of said seal film.

21. The process of claim 19, said supporting block being a foam core.

22. The process of claim 19, including spreading the resin flow from the resin inlet line over the width of said foam block prior to flowing said resin through said path defined by said bleeder layer.

23. The process of claim 19, including providing additional resin flow paths along the length of said fiber reinforcement layer, said additional resin flow paths being in communication with said bleeder layer.

24. The process of claim 23, said additional resin flow paths comprising a screen placed between at least a portion of said separator film and said bleeder layer.

25. The process of claim 19, said fiber reinforcement layer comprising a carbon fiber layer and said bleeder layer comprising a fiberglass cloth.

26. A process for vacuum impregnation of a fiber reinforcement which comprises:
- placing a runner plate on a tool, said runner plate containing a plurality of runner channels in the lower surface thereof, and a plurality of outlet holes in the upper surface and communicating with said runner channels,
- applying a dry fiber reinforcement layer on said runner plate,
- placing a pressure plate on said fiber reinforcement layer, said pressure plate having a plurality of holes therein offset from the outlet holes in the lower runner plate,
- applying a bleeder layer over said pressure plate,
- applying a vacuum bag over the entire assembly,
- providing a source of liquid resin and a resin inlet line in communication with the runner channels in said runner plate,
- providing a source of vacuum communicating with said vacuum bag, and
- drawing a vacuum and permitting passage of the liquid resin through said resin inlet line, said runner channels and the outlet holes in said runner plate, through said fiber reinforcement layer to provide substantially uniform resin impregnation therein, into and through the offset holes in said pressure plate, and into said bleeder layer.

27. The process of claim 26, said runner channels and said outlet holes in said runner plate being tapered to permit easy removal of resin after completion of resin cure.

28. The process of claim 26, including sealing the pressure plate on all sides to the tool to form a cocoon assembly between the tool and the pressure plate, with the fiber reinforcement layer and the runner plate within the cocoon assembly, said vacuum bag being sealed over the entire assembly.

29. The process of claim 28, said bleeder layer located over said cocoon assembly and extending on one end away from said cocoon assembly, and including an outlet in the vacuum bag over said bleeder layer at said extending end thereof, and a vacuum line communicating with said outlet and said source of vacuum.

30. The process of claim 26, said resin inlet line communicating with the runner channels substantially at the center of said runner plate.

31. The process of claim 29, said runner channels and said outlet holes in said runner plate being tapered to permit easy removal of resin after completion of resin cure, and said resin inlet line communicating with the runner channels substantially at the center of said runner plate.

32. In a process for vacuum impregnation of a fiber reinforcement with a resin to produce a resin-fiber composite, the steps which comprise:
- applying a dry fiber reinforcement layer on a tool,
- positioning a bleeder layer over said fiber reinforcement layer,
- applying a vacuum bag over the entire assembly,
- providing a source of liquid resin and a resin inlet line to the assembly and communicating with said bleeder layer,
- providing a source of vacuum communicating with said vacuum bag,
- drawing a vacuum to permit passage of the liquid resin through said resin inlet line,
- spreading the resin flow from the resin inlet line for the full width of said fiber reinforcement layer transversely from edge to edge thereof, and
- flowing said liquid resin along a flow path through said bleeder layer and into and through the fiber reinforcement layer longitudinally therein from one end thereof to the opposite end of the fiber reinforcement layer to impregnate same uniformly across the length and width of the fiber reinforcement layer.

* * * * *